US008091517B2

(12) United States Patent
Auweder et al.

(10) Patent No.: US 8,091,517 B2
(45) Date of Patent: Jan. 10, 2012

(54) THERMOSTATIC VALVE

(75) Inventors: Andreas Auweder, Vaihingen/Enz (DE); Eike Willers, Stuttgart (DE)

(73) Assignee: Behr Thermot-Tronik GmbH, Kornwestheim (DE)

( * ) Notice: Subject to any disclaimer, the term of this patent is extended or adjusted under 35 U.S.C. 154(b) by 520 days.

(21) Appl. No.: 12/227,088

(22) PCT Filed: May 18, 2007

(86) PCT No.: PCT/EP2007/004454
§ 371 (c)(1),
(2), (4) Date: Nov. 5, 2008

(87) PCT Pub. No.: WO2007/134808
PCT Pub. Date: Nov. 29, 2007

(65) Prior Publication Data
US 2009/0205589 A1     Aug. 20, 2009

(30) Foreign Application Priority Data
May 23, 2006   (DE) .......................... 10 2006 025 064

(51) Int. Cl.
*F01P 3/00*   (2006.01)
(52) U.S. Cl. .................. 123/41.1; 236/92 R; 236/101 C
(58) Field of Classification Search ................ 123/41.1, 123/41.29, 41.09; 236/34.5, 92 R, 101 C
See application file for complete search history.

(56) References Cited

U.S. PATENT DOCUMENTS

| 5,494,005 A * | 2/1996 | Saur ............................. 123/41.1 |
| 2007/0062466 A1 | 3/2007 | Engelin et al. ................ 123/41.1 |

FOREIGN PATENT DOCUMENTS

| DE | 8904436.3 | 6/1989 |
| DE | 9407641.3 | 8/1994 |
| DE | 44 27 340 A1 | 2/1995 |
| DE | 44 12 482 A1 | 10/1995 |
| DE | 44 16 554 A1 | 11/1995 |
| DE | 195 45 081 A1 | 6/1997 |
| DE | 103 18 813 A1 | 11/2004 |
| DE | 10 2004 021 009 A1 | 11/2005 |
| DE | 102004021009 | * 11/2005 |
| FR | 2 601 719 | 1/1988 |
| JP | 1-125516 | 5/1989 |
| WO | WO 2005/088098 A1 | 9/2005 |

OTHER PUBLICATIONS

DE 102004021009A1, Thermostat valve, Elke Willers et al. PTO 11-3015 Translation Apr. 2011.*
German Search Report.
International Preliminary Report on Patentability.

* cited by examiner

*Primary Examiner* — Noah Kamen
(74) *Attorney, Agent, or Firm* — K&L Gates LLP

(57) ABSTRACT

A thermostatic valve for a cooling system of an internal combustion engine, having a thermostatic operating element for arrangement in a distributing chamber as the drive element for a main valve element between an engine outlet and a connector to a coolant cooler, and for a bypass valve element designed as a valve slide arranged between the engine outlet and an engine inlet to serve as a pressure control valve. In addition to the valve slide (23, 23') the bypass valve element (22, 22') is provided with a valve disk (25, 25' arranged upstream of the valve slide (23, 23') in the extension direction of the thermostatic operating element (12, 12'), and a component (26) is assigned to the valve disk (25, 25'), as a valve seat for the valve slide (23, 23') and a valve seat for the valve disk (25, 25').

10 Claims, 4 Drawing Sheets

THERMOSTATIC VALVE

CROSS-REFERENCE TO RELATED APPLICATIONS

This application claims the benefit of German patent application 10 2006 025 064.8, filed May 23, 2006, herein incorporated by reference.

BACKGROUND OF THE INVENTION

The invention relates to a thermostatic valve for a cooling system of an internal combustion engine, having a thermostatic operating element to be arranged in a valve chamber, which is used as the drive element for a main valve element to be arranged between an engine outlet and a connector leading to a coolant cooler, and for a bypass valve element, which is designed as a valve slide, to be arranged between the engine outlet and an engine inlet and which has a pressure control valve function.

In order to shorten the warm-up phase when starting an internal combustion engine with cold coolant, and to improve the combustion by means thereof, it is known to keep the main valve, as well as the bypass valve, closed during the warm-up phase. To avoid thermal and/or mechanical damage to the internal combustion engine and associated components when the internal combustion engine in the cold state is operated at high engine rpm, a pressure control valve is provided, which opens at increased engine rpm and correspondingly increased pressure and allows a flow of coolant from the engine outlet to the engine inlet. In this connection it is known (German Patent Publication DE 102004021009 A1) to design the bypass valve element as a pressure control valve.

SUMMARY OF THE INVENTION

The object of the invention is based on creating a thermostatic valve of the type mentioned at the outset, which is as simple as possible and has as short as possible a dimension in the longitudinal direction of the thermostatic operating element.

This object is attained in that the bypass valve element is provided with a valve disk in addition to the valve slide, which is arranged upstream of the valve slide in the extension direction of the thermostatic operating element, and that a component is assigned to the valve slide and the valve disk, which constitutes a valve seat for the valve slide, as well as a valve seat for the valve disk.

Based on this embodiment, a structurally simple design is possible.

In designing the invention, a spacing is provided between the valve slide and the valve disk of the bypass valve element in the extension direction of the thermostatic operating element. By means of this design, the function results that, in addition to function of the pressure control valve, when the thermostatic operating element responds, the bypass valve (and therefore the main valve) is initially opened, and the bypass valve is closed again only when a predefined temperature has been reached.

In further development of the invention it is provided that the common component can be sealingly inserted at a predetermined position into a receptacle of the engine block or of a cylinder head. In this way it is assured that no work is required on the engine block or cylinder head, or that a support surface for a spring must be formed in order to obtain the function of the bypass valve and the pressure control valve.

In further development of the invention it is provided that an upper part of the valve constitutes a finished component containing the thermostatic operating element, the main valve element, the restoring spring, the bypass valve element, the pressure control spring and the valve seat for the slide valve and the bypass valve. The finished component can be produced and its function can be tested in the manufacturing facility of the thermostatic valve. It merely needs to be mounted in the appropriate internal combustion engine, without adjustment work or other work on it being required.

BRIEF DESCRIPTION OF THE DRAWINGS

Further characteristics and advantages of the invention ensue from the following description of the exemplary embodiment represented in the drawings and from the dependent claims.

DETAILED DESCRIPTION OF THE PREFERRED EMBODIMENTS

Figure 1:
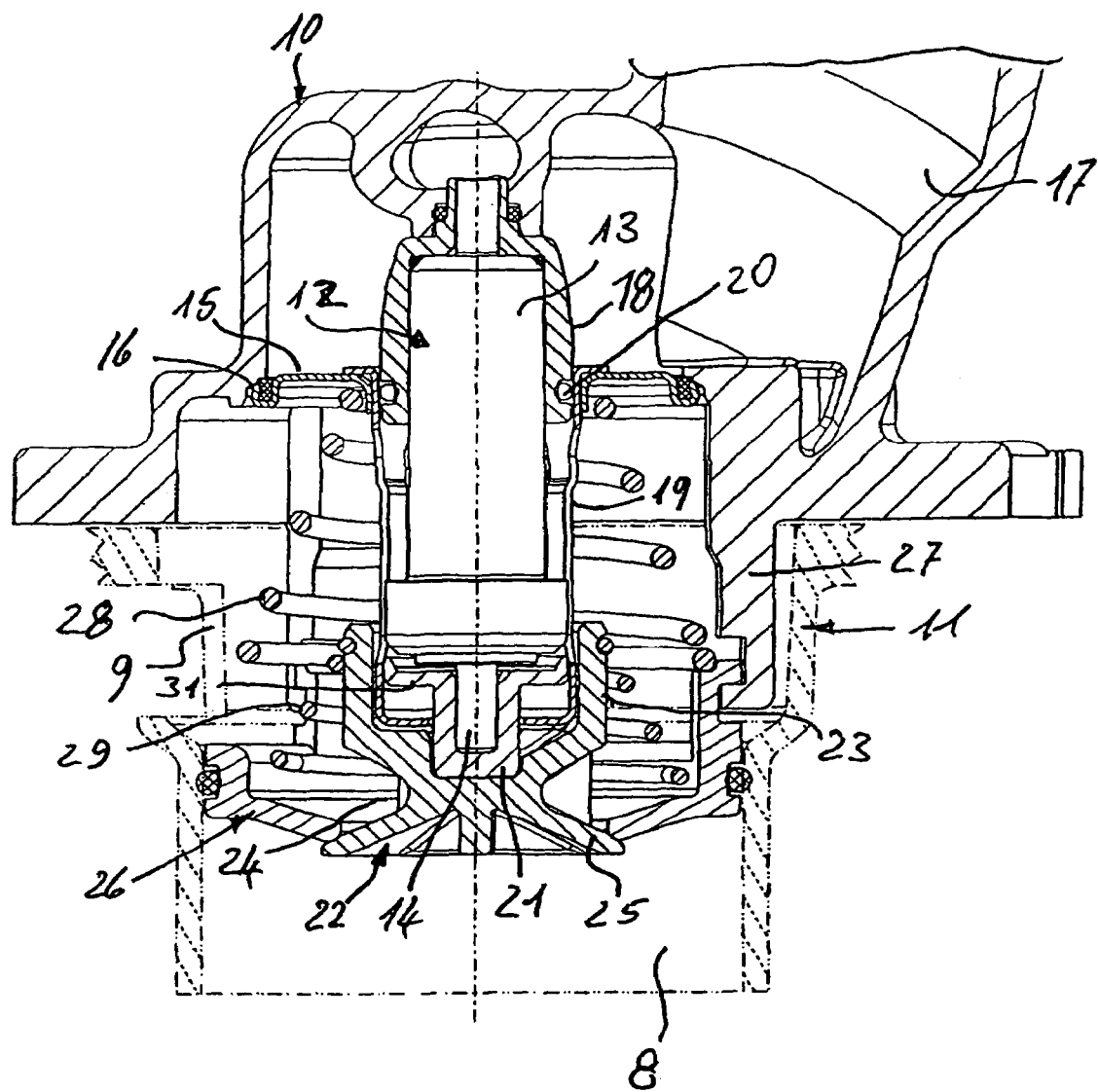
FIG. 1 shows an axial sectional view through an exemplary embodiment of a thermostatic valve in accordance with the invention in the cold state.

The thermostatic valve represented in the drawings has a cover-like upper valve element 10, which can be attached with a flange-like part to an engine block 11 or cylinder head, sketched in dash-dotted lines, of an internal combustion engine. The upper valve element 10 receives a thermostatic operating element 12 which, in the installed state, projects into a valve chamber. The thermostatic operating element 12 has a housing 13, in which an expanding material is arranged, for example a wax mixture. This expanding material changes its volume as a function of temperature and, in case of an appropriate temperature increase, drives a work piston 14 out of the housing 13. In the course of its extension, the work piston 14 takes along a valve disk 15, i.e. the main valve disk. Together with a valve seat 16, the main valve disk 15 constitutes a main valve, which is arranged between the distributing chamber and a connector 17 leading to a coolant cooler. In the exemplary embodiment, the connector 17 is embodied as a hose connector.

With the interposition of a plastic cap 18, the housing 13 of the thermostatic operating element 12 is supported on the upper valve element 10. The main valve disk 15 has a cage-like center element 19, which surrounds the housing 13 of the thermostatic operating element 12 and whose bottom is in contact with the work piston 14. The plastic cap 18 is provided with a seal ring 20 which, in the closed state, sees to it that the main valve disk seals the distributing space or distributing chamber against the connector 17. In a modified embodiment, the upper valve element 10 is not made of metal, but of plastic. In this embodiment the plastic cap 18 is integrated into the upper valve element 10.

A cap-shaped transfer element 21 has been placed on the work piston 14 and penetrates through the bottom of the center element 19 of the main valve disk 15. The transfer element 21 has an annular shoulder 31, which is located at a distance opposite the center element 19.

Because of its areas which are exposed by means of recesses in the center element 19 of the main valve disk 15, the housing 13 lies in the distributing chamber in which an engine outlet opening 9 terminates. In the area facing the distributing chamber (in the drawings the area located underneath the main valve disk 15), the housing 13 is exposed to the coolant coming from the engine.

The transfer element 21 has been inserted with its peg-like section into a cutout of a bypass valve element 22. The bypass valve element 22 has an interior cutout which surrounds the center element 19 of the main valve disk 15 and is provided in its bottom area with a guide device, surrounded by ribs, for the transfer element 21.

Figure 2:
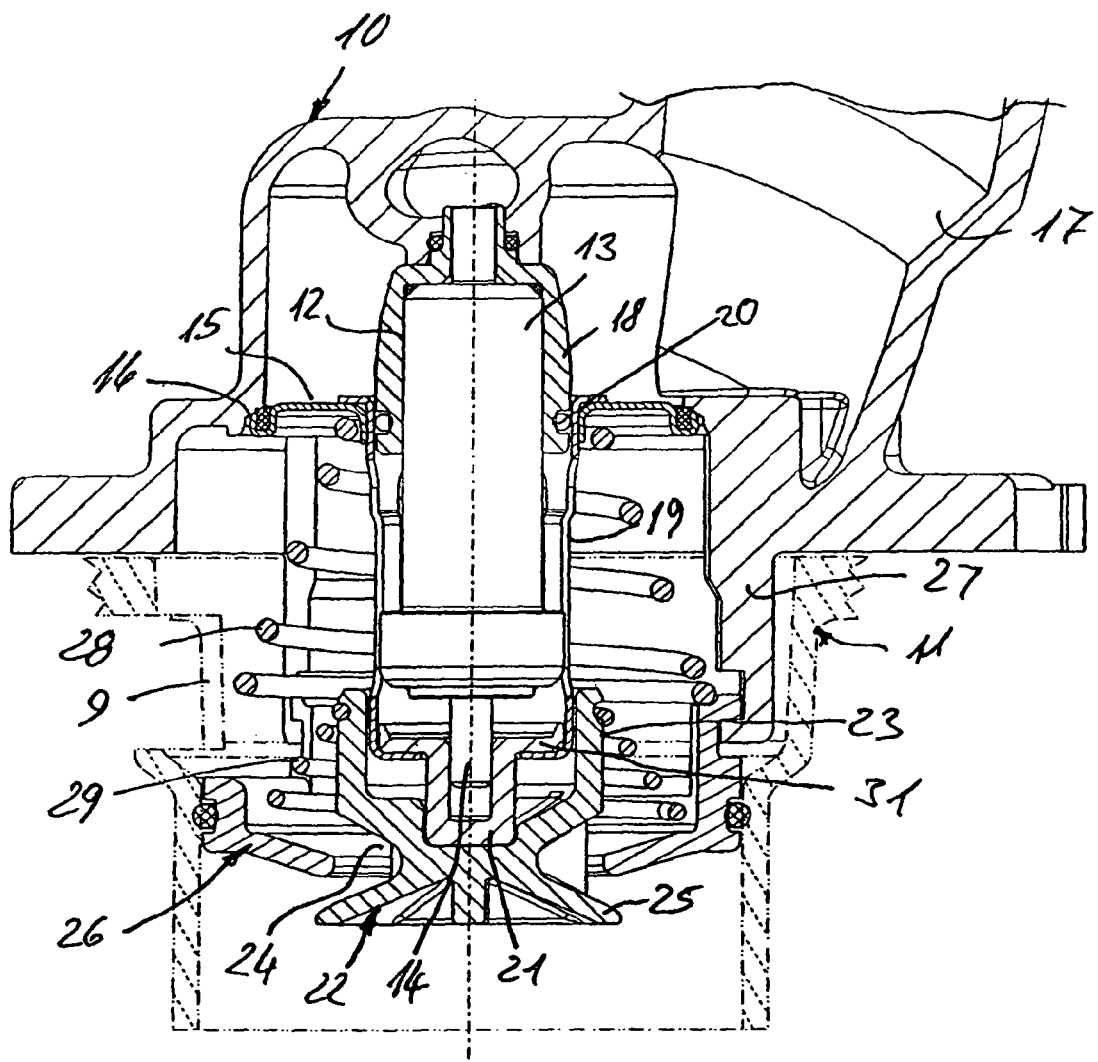
FIG. 2 is a sectional view through the thermostatic valve in FIG. 1 when the pressure control function responds.

By means of its cylindrical area, the bypass valve element 22 constitutes a valve slide 23. A cutout 24 adjoins this valve slide in the extension direction of the work piston 14 and makes a transition into a valve disk 25 which, in the exemplary embodiment, is approximately conical. Stiffening ribs are provided in the area of the valve disk 25 and in the area of the cutout 24, which are also used for guiding the bypass valve element 22 when the latter is opened (FIG. 2).

A component 26, which has an approximately ring-shaped form and is sealingly inserted into a bore of an engine block 11 or cylinder head, is assigned to the bypass valve element 22. On the exterior it is provided with an annular groove and an inserted ring seal. The component 26 constitutes the valve seats for the valve disk 25, as well as for the valve slide 23, of the bypass valve element 22. The valve seat 25 rests, opposite to the extension direction of the work piston, against the center cutout of the component 26, and in this way constitutes a valve seat together with this edge of the center cutout. The interior diameter of the center cutout of the component 26 is matched to the exterior diameter of the valve slide 23 of the bypass valve element 22, so that this interior diameter constitutes a slide valve seat for the slide valve 23.

The component 26 is suspended in three or more fingers 27 (possibly also only two fingers), which project away from the upper valve element 10 and extend into the interior of the bore of the engine block 11 or cylinder head. The component 26 is used as a support for a restoring spring 28, which applies a force to the main valve disk 15 and pushes it into a closed position. The component 26 is furthermore used as a support for a pressure control spring 29, whose other end is fixed in place on the bypass valve element 22, in the exemplary embodiment it is snapped into an annular groove.

The pressure control spring 29 is dimensioned in such a way that it can push the work piston 14 back completely into the housing 13 of the thermostatic operating element 12 via the bypass valve element 22 and the transfer element 21. Furthermore, the pressure control spring 29 is laid out for a pressure control function. The layout is such that it yields if a defined pressure acts on the free face of the valve disk 25 facing the distributing chamber. Thus, the opening force of the pressure control valve is for one a function of the size of the overpressure in the distributing chamber, and furthermore of the size of the free surface of the valve disk 25, which is charged with the medium under pressure.

As has already been mentioned, an engine outlet terminates in the distributing chamber between the component 26 and the main valve disk 15. The component 26 is arranged upstream of an engine inlet opening 8, i.e. the component 26 separates the distributing chamber from the engine inlet.

With a cold internal combustion engine and cold coolant, the thermostatic valve is in the position in accordance with FIG. 1, i.e. the main valve disk 15 is closed. The bypass valve is also closed, because the valve disk 25 of the bypass valve element 22 rests against its valve seat constituted by the component 26.

In case the internal combustion engine is operated with increased engine rpm before the coolant has been noticeably warmed up, the pressure of the coolant in the distributing chamber is increased. To prevent mechanical and/or thermal damage of the internal combustion engine and/or of components connected therewith, an overpressure function is used in this case, in which the valve disk 25 is lifted off its seat constituted by the component 26 and releases a bypass connection between the outlet 9 of the internal combustion engine and the engine inlet 8.

When the temperature of the internal combustion engine, and therefore of the coolant, has reached the response temperature of the thermostatic operating element 12, the work piston 14 is extended out of the housing 13. In the course thereof, first the bypass valve is opened in that the valve disk 25 of the bypass valve element 22 is lifted off the valve seat constituted by the component 26. Only when the work piston 14 has been extended so far that the distance between the annular shoulder 31 of the transfer element and the bottom of the center element 19 of the main valve seat is bridged, i.e. is an unoccupied path, is the main valve seat 15 taken along. With the continued extension movement the main valve disk 15 is lifted off its valve seat 16, while the valve slide 23 of the bypass valve element 22 closes the bypass valve.

Since the valve seats assigned to the bypass valve are constituted by the component 26 which, together with the upper valve element 10, the thermostatic operating element, the main valve disk, the bypass valve element 22, the restoring spring 28, and the pressure control spring 29 constitute a ready-assembled structural unit, no work on the internal combustion engine and/or the formation of an support surface for a spring is required. The function of the finished component can be tested and adjusted by the manufacturer of the thermostatic valve.

The invention has been explained by means of the exemplary embodiment of an electrically heatable thermostatic operating element 12. An electrical heating element is arranged in the housing 13 of the thermostatic operating element, which can be supplied with electrical energy through the bottom of the housing 13 in a manner not represented in detail. By means of being supplied with electrical energy, the thermostatic valve can be opened, or opened wider, independently of the coolant temperature. The invention is of course also advantageous if no electrically heatable thermostatic operating element is provided.

In connection with a modified embodiment it has been provided that the thermostatic operating element 12 is arranged turned by 180°, i.e. that the work piston 14 is supported on the upper valve element 10, while in this case the housing 12 is movable by means of the extension movement of the work piston. The main valve disk 15, which is then given a different form, is then attached to the housing 13 and can be displaced along with it. In the same way the bypass valve element 22 is then attached in a changed form to the housing 13, for example on a bolt which lengthens the housing 13.

In connection with a modified embodiment it has been provided that the restoring spring 28 is supported not on the component 26, but on its own cross arm, which is supported by the fingers 27.

In the embodiment represented, the pressure control spring 29 has been arranged in a particularly spatially advantageous manner. However, it is also possible to provide the component 26 with fingers on the side of the valve disk 25, in which a cross arm is suspended, on which a pressure control spring is supported, whose other end is supported on the bypass valve element 22.

Figure 3:
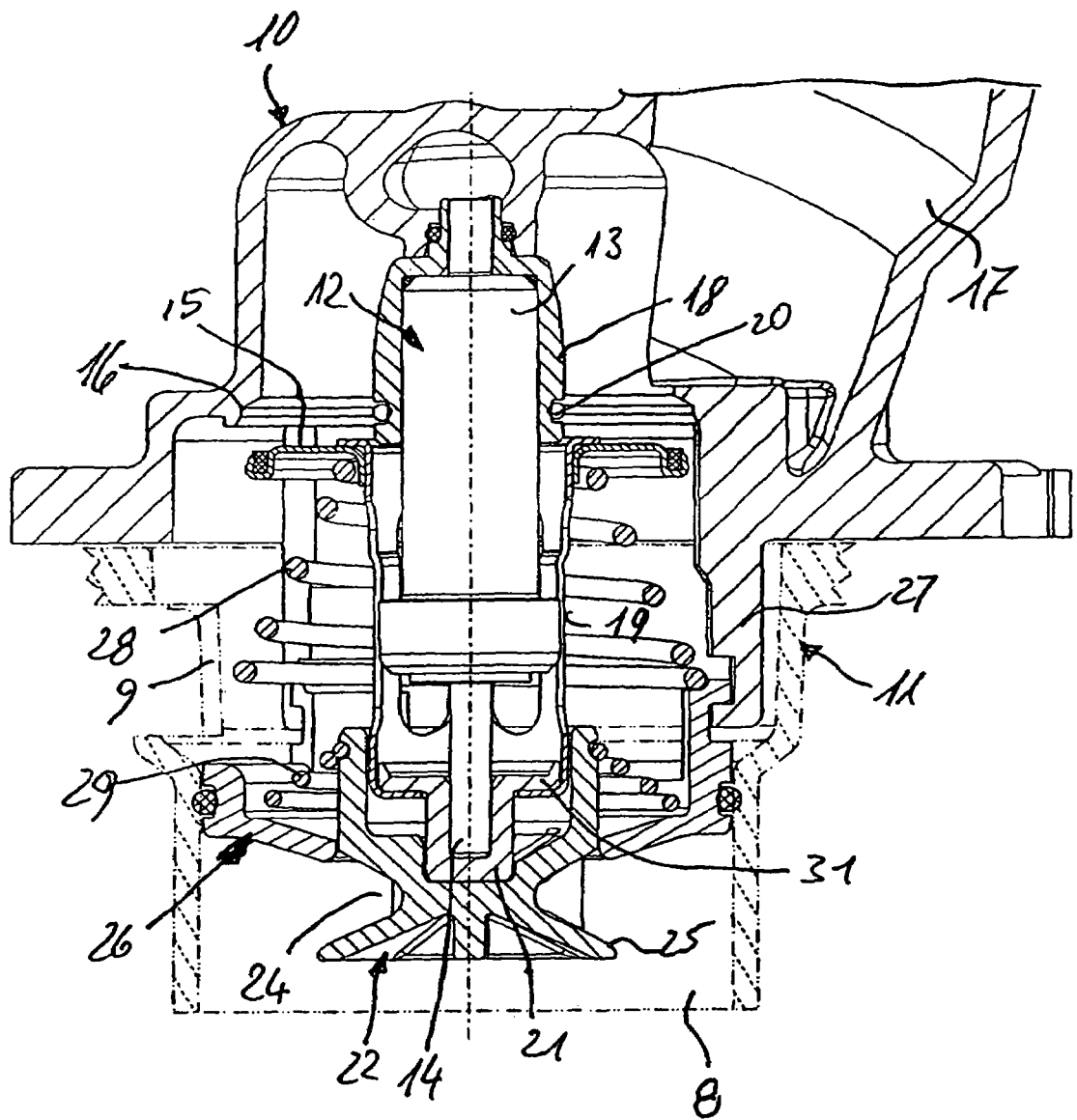
FIG. 3 is a sectional view through the thermostatic valve in FIG. 1 with the main valve opened and the bypass valve closed.
Figure 4:
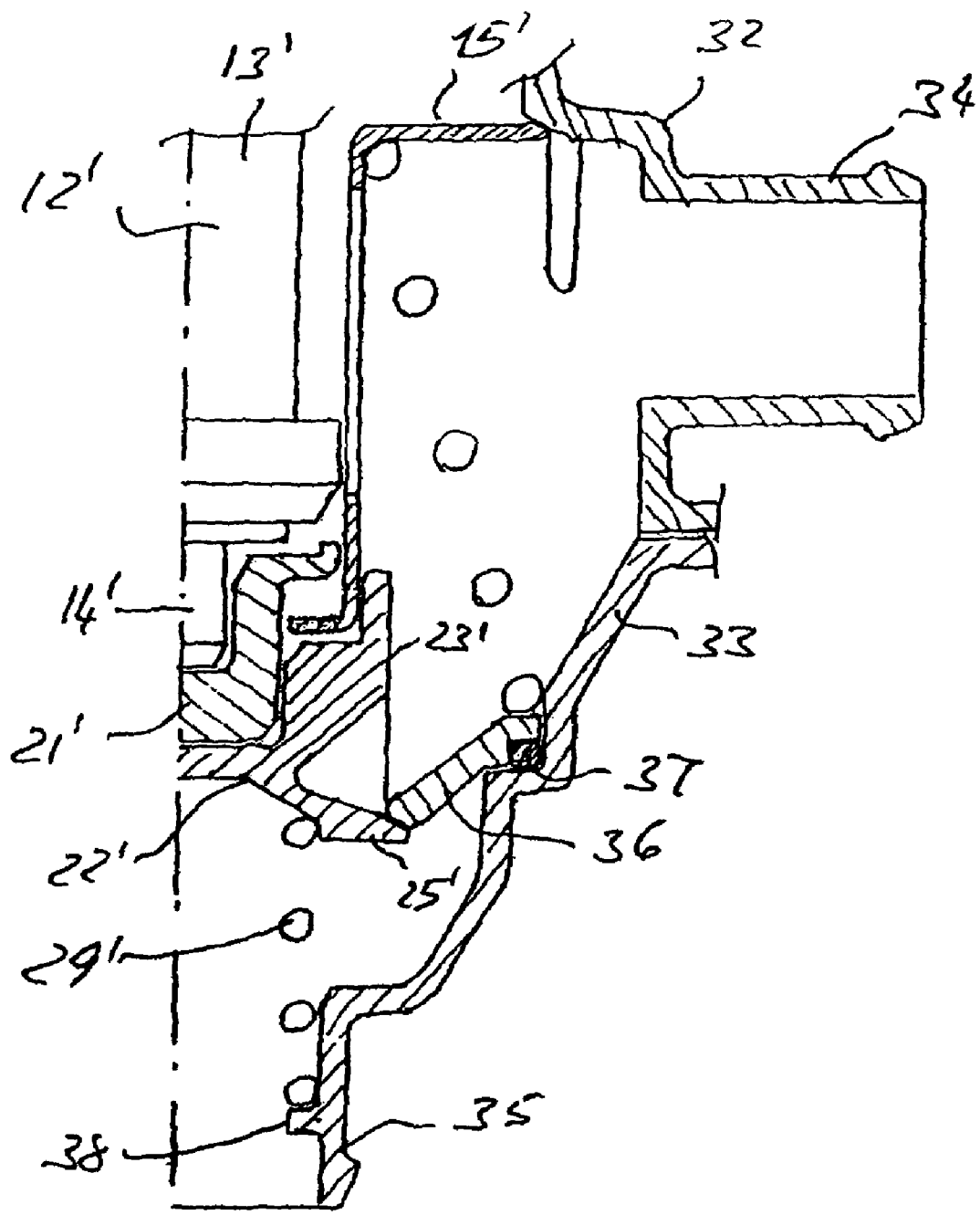
FIG. 4 is a partial axial sectional view through an embodiment designed as a housing-contained thermostat.

The thermostatic valve in the embodiment in accordance with FIG. 4 is designed as a so-called housing-contained thermostat, which is arranged outside of the engine block or cylinder head of an internal combustion engine. The housing consists of an upper valve element 32 and a lower valve element 33, which is fixedly or releasably connected with it. Both are preferably made of plastic. The upper valve element is provided with a hose connection 34, to which a hose coming from an engine outlet opening of an internal combustion engine can be attached. Moreover, the upper valve element 32 has a hose connector, coaxially with a thermostatic operating element 12', for a hose leading to a coolant cooler. The lower valve element 33 is provided with hose connector 35, which is coaxial with the operating element 12' and to which a hose leading to an engine inlet opening can be connected. In accordance with the embodiment of FIGS. 1 to 3, the housing 13' of the thermostatic operating element 12' is supported on the upper valve element 32. In the course of its extension over a transfer element 21', the work piston 14' first takes along a bypass valve element 22' and, after passing through an unoccupied path, also a main valve disk 15'.

The main valve disk 15' is under pressure from a closing spring 28', which is supported in a ring-shaped insert 36, which has been placed into the lower valve element 33 with the interposition of a sealing ring 37. The insert 36 forms a valve seat for a valve disk 25' of the bypass valve element 22', as well as a valve seat for a section of the bypass valve element 22' embodied as a valve slide 23'. In the same way the insert 36 forms a guide for the stiffening ribs of the bypass valve element 22', which are located between the valve disk 25' and the valve slide 23'. The bypass valve element 22' is charged by a pressure control spring 29', which is supported on an annular collar 38 of the lower valve element 33, which is arranged in the interior of the hose connector 35, which is a part of the engine inlet opening.

The invention claimed is:

1. A thermostatic valve for a cooling system of an internal combustion engine wherein a coolant flows among an engine outlet, a coolant cooler, and an engine inlet, the thermostatic valve comprising:
   a coolant distributing chamber communicating with each of the engine outlet, the coolant cooler, and the engine inlet,
   a main valve element arranged between the engine outlet and the coolant cooler,
   a bypass valve element arranged between the engine outlet and the engine inlet,
   a thermostatic operating element (12, 12') arranged in the distributing chamber for movement in response to coolant temperature in an extension direction between a non-extended position and an extended position for driving the main valve element and the bypass valve element for opening communication between the engine outlet and the coolant cooler,
   the bypass valve element serving as a pressure control valve and including a valve slide portion (23, 23') for closing communication between the engine outlet and the coolant cooler upon movement of the thermostatic operating element in the extension direction and a valve disk portion (25, 25') disposed upstream of the valve slide portion in the extension direction for closing communication between the engine outlet and the coolant cooler when the thermostatic operating element is in its non-extended position, and
   a seat component (26) sealably engagable with the valve disk portion when the thermostatic operating element is in its non-extended position and sealably engagable with the valve slide portion when the bypass valve is moved in the extension direction.

2. The thermostatic valve in accordance with claim 1, characterized in that a spacing is provided between the valve slide portion (23) and the valve disk portion (25) of the bypass valve element (22) in the extension direction of the thermostatic operating element (12).

3. The thermostatic valve in accordance with claim 2, characterized in that the bypass valve element (22) is provided with a cutout (24) between the valve slide portion (23) and the valve disk portion (25) of the bypass valve element (22).

4. The thermostatic valve in accordance with claim 1, characterized in that the seat component (26) can be sealingly inserted at a predetermined position into a receptacle of an engine block or of a cylinder head.

5. The thermostatic valve in accordance with claim 1, characterized in that the seat component (26) is used as a support for a restoring spring (28) of the main valve element (15).

6. The thermostatic valve in accordance with claim 1, characterized in that the seat component (26) is used as a support for a pressure control spring (29).

7. The thermostatic valve in accordance with claim 6, characterized in that pressure control spring (29) is fixed in place on the bypass valve element (22).

8. The thermostatic valve in accordance with claim 1, characterized in that an upper valve element (10), together with the thermostatic operating element (12), the main valve element (15), the restoring spring (28), the bypass valve element (22), the pressure control spring (29) and the seat component (26) for the bypass valve element (22) constitute a pre-assembled structural unit.

9. The thermostatic valve in accordance with claim 8, characterized in that the upper valve element (10) is provided with fingers (27), which extend in the extension direction of the thermostatic operating element (12) and on which the component (26) is held.

10. The thermostatic valve in accordance with claim 1, characterized in that the thermostatic valve it is embodied as a housing-contained thermostat provided with hose connectors (34, 35).

\* \* \* \* \*